June 13, 1933.   T. A. POHJOLA   1,913,855
TRAFFIC SIGNAL SWITCH FOR MOTOR VEHICLES
Filed June 19, 1930
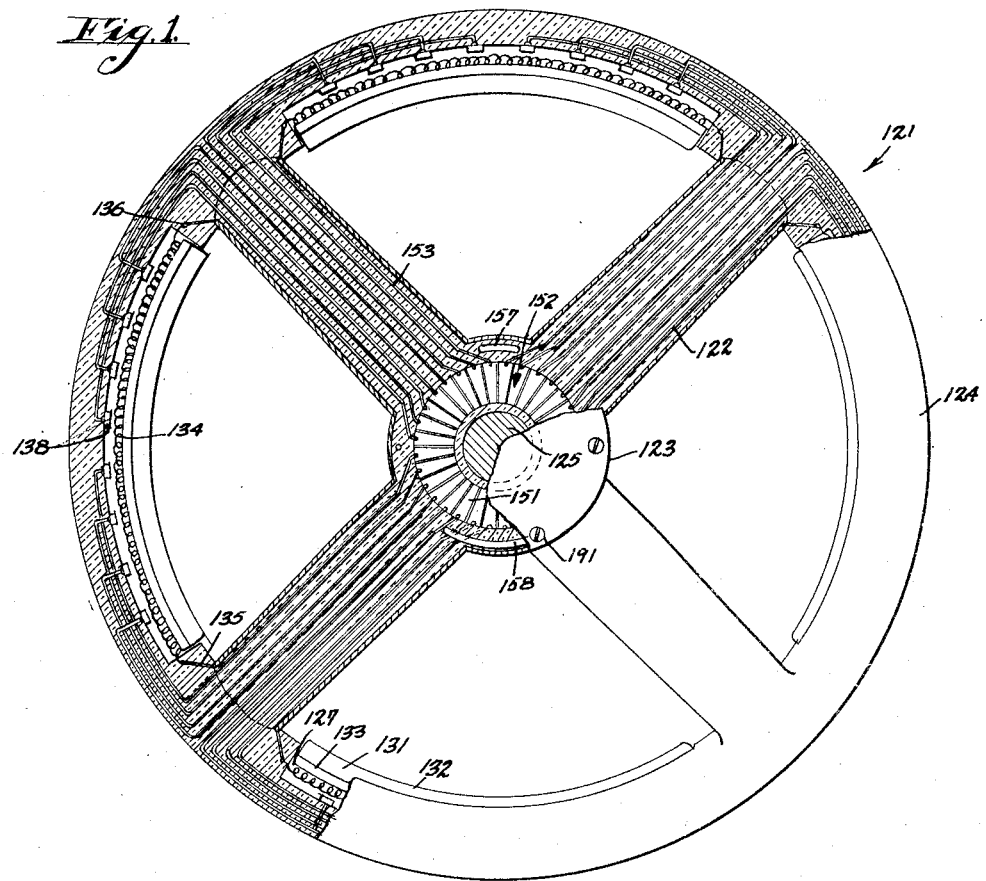
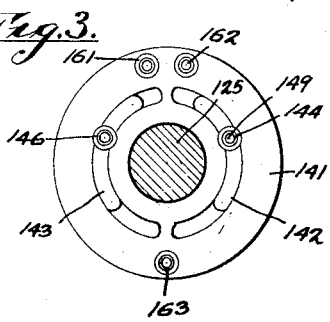
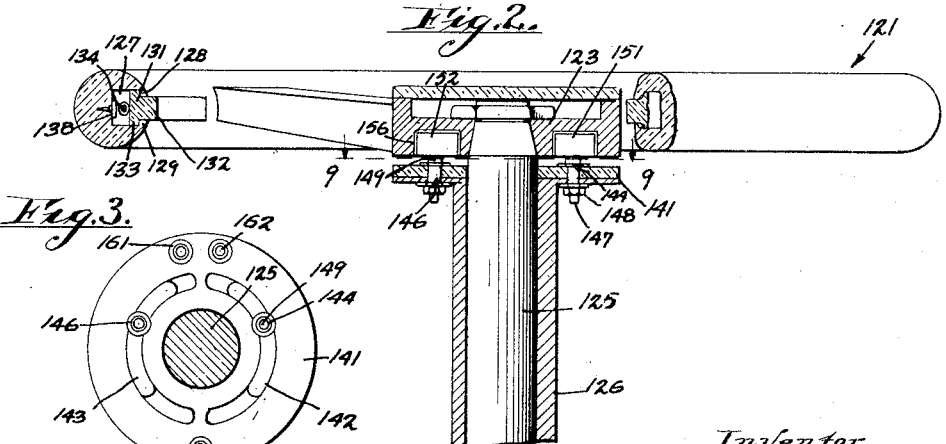
Inventor
Tony A. Pohjola
by Hazard and Miller
Attorneys Patented June 13, 1933

1,913,855

UNITED STATES PATENT OFFICE

TONY A. POHJOLA, OF LOS ANGELES, CALIFORNIA, ASSIGNOR OF ONE-HALF TO MATT KAUTTO, OF LOS ANGELES, CALIFORNIA

TRAFFIC SIGNAL SWITCH FOR MOTOR VEHICLES

Application filed June 19, 1930. Serial No. 462,304.

This invention relates to traffic signal switches for motor vehicles, and has for an object the provision of a novel design of traffic signal switch which is adapted to be actuated by the mere pressure of the operator's fingers against a portion of the steering wheel of a vehicle.

A further object is to provide means for controlling the signaling device, within the rim of the steering wheel of the vehicle, whereby the signaling device may be actuated by pressing against a relatively restricted portion on the circumference of the rim and upon that side of the wheel which corresponds to the direction in which the turn is to be made.

The invention possesses other objects and advantageous features, some of which, with those enumerated, will be set forth in the following description of the invention's particular embodiment which is illustrated in the drawing accompanying and forming a part of the specification.

Referring to the drawing:

Fig. 1 is a plan view of the steering wheel partially broken away and shown in section to disclose the construction of the control switches whereby the signaling device is actuated;

Fig. 2 is a view in elevation, of the steering wheel partially broken away and shown in section;

Fig. 3 is a horizontal sectional view taken upon the line 9—9 of Fig. 2, with the direction of view as indicated.

The traffic signal to which my invention is applied requires the provision of an especially constructed steering wheel 121 which has the external appearance of a conventional steering-wheel, being composed of spokes 122 radiating from a hub 123 to a rim 124. The steering wheel 121 is adapted to serve the normal functions of a conventional steering wheel, its hub 123 being mounted upon a steering column 125 in the conventional manner, the column 125 extending loosely through a tube 126, according to conventional design.

The steering wheel 121 differs from the conventional steering wheel however, in that a plurality of slots 127 extend into the rim 124 from the inner circumference 128 of the rim, each of these slots extending throughout substantially the entire arcuate portion of the rim 124 between each adjacent pair of spokes 122. Each of the slots 127 is substantially T-shaped in cross-sectional configuration, the narrow portion 129 being that portion which opens to the atmosphere, at the inner circumference 128 of the rim. A T-shaped strip 131 of rubber or other suitable flexible and preferably resilient material, is disposed with its narrow portion 132 within the narrow portion 129 of the slot 127, the extreme inner edge of the narrow portion 132 of the strip 131, being exposed at the inner circumference 128 of the rim 124. The wider portion 133 of the strip 131, is not as thick as the widest portion of the slot 127, whereby a selected portion of the strip 132 may be pressed radially outwards with respect to the rim 124, and taper into the associated portion of the slot 127 by exerting finger pressure against the associated portion of the extended inner edge of the narrow portion 132 of the strip 131. Within each of the arcuate slots 127, a coil spring 134 of suitable conducting material, is stretched, each end of each spring 134 being anchored at the associated end of its slot 127, by a suitable pin 136. Each of the springs has sufficient tension imposed thereupon, to continually urge all portions of the spring radially inwards toward the center of the wheel 121, thereby retaining not only the spring 134 but also the strip 131 in normal retracted position. Each of the springs 134 is electrically grounded to the frame of an automobile, by being connected to one of the spokes 122 of the steering wheel by a conductor 135; and inasmuch as the storage battery of the automobile is also grounded, each of the springs 134 is continually energized.

A plurality of fixed electric contacts 138 are mounted in spaced relationship in the bottom of each of the slots 127. Accordingly, these contacts 138 are disposed beyond the associated spring contact 134 from the center of the steering wheel, whereby electrical engagement may be established between any one of the fixed contacts 138 and the associated spring contact 134, by exerting finger pressure against that portion of the extended edge 132 of the flexible strip 131 which is proximal to the selected fixed contact 138 to be energized.

A circular plate 141 of insulating material, is affixed to the upper end of the steering column tube 126. A pair of arcuate slots 142 and 143 are formed in the plate 141, each of these slots extending throughout only slightly less than 180°. Contact pins 144 and 146 are adjustably mounted in each of the arcuate slots 142 and 143, each of these pins being in the form of a threaded bolt 147 having a nut 148 threaded thereon beneath the plate 141, whereby the bolt 147 may be releasably clamped in selected position intermediate the ends of the associated slot 142 or 143, as the case might be. The heads 149 of the bolts 147, serve as the portions thereof which make electrical contact with the selected one of a plurality of segments 151 arranged in a commutator ring 152 which is mounted in the under surface of the hub 123 of the steering wheel 121. The number of segments 151 corresponds to the number of fixed contacts 138 in the rim 124 of the steering wheel; and each segment 151 is electrically connected to one of the fixed contacts 138 by a conductor 153. Preferably all the conductors 153 are concealed from view by passing through the spokes 122 of the steering wheel. Each of the segments 151 and the fixed contact 138 which is electrically connected thereto, are arranged in a line radiating from the axis of rotation of the steering wheel 121; with the result that when one of the contact pins 144 or 146 makes engagement with a selected segment 151, electrical connection is established between that contact pin and the fixed contact 138 in the corresponding portion of the steering wheel 121. However, the slots 142 and 143 are disposed upon the right and left hand sides respectively, of the plate 141; with the result that electrical connection can be established between the pin 144 and any one of the fixed contacts 138 which is upon the right hand side of the steering wheel 121 when the steering wheel is in that position in which the automobile is being guided straight ahead. Similarly, electrical connection can be established between the contact pin 146 and any one of the fixed contacts 138 which is upon the left hand side of the steering wheel 121 under similar conditions.

The segments 151 of the commutator ring 152, are mounted in an annular block 156 of insulating material which is set into the under side of the hub 123; with the result that each of the segments 151 is electrically insulated from all the others. Also mounted upon the under side of the hub 123 and insulated therefrom, is a relatively short arcuate conducting strip 157 and a somewhat longer arcuate conducting strip 158 at the top and bottom respectively, of the hub 123. Another pair of contact pins 161 and 162 are mounted upon the plate 141 in position to be electrically interconnected by the conducting strip 157. When the steering wheel 121 is in straight ahead position, a single contact pin 163 is also mounted in the plate 141, but diametrically opposite the pins 161 and 162 so that it is adapted to be engaged by the arcuate strip 158. However, inasmuch as the arcuate strip 158 is materially longer than the strip 157, electrical engagement between the strip 158 and the contact pin 163 will be established as the wheel 121 approaches straight ahead position and before the strip 157 engages both contact pins 161 and 162, this latter engagement taking place as the wheel 121 attains straight ahead position.

*Electrical connections and operation*

As explained hereinabove, each of the flexible contact springs 134, is grounded to one of the spokes 122 of the steering wheel. Accordingly, when electrical engagement is established between one of the fixed contacts 138 and the associated spring contact 134, current will flow from the battery through its ground connection 137 and through the frame of the automobile, the ground connection associated with the selected spring 134, and to that spring, thereby energizing the selected fixed contact 138. In this way, current can be supplied to the segment 151 with which either of the pin contacts 144 or 146 is in engagement. It should be explained that the pin contacts 144 and 146 should be shifted in their associated slots 142 and 143 respectively, so that they establish electrical engagement with those segments 151 which are electrically connected to such fixed contacts 138 that the maximum amount of convenience will be afforded the operator of the vehicle, and that the remaining fixed contacts 138 will thereby be rendered inoperative. Accordingly, when a portion of one of the flexible strips 134 on the right hand side of the steering wheel 121 is pressed, current is conducted from the battery to the contact pin 144 which is upon the right hand side of the plate 141.

When the driver contemplates turning to the left, he may set the turn signal to indicate that he is about to alter his direction of travel in this manner, by depressing that portion of one of the flexible strips 131 which is upon the left hand side of the steering wheel 121 and which is proximal to that fixed contact 138 which is electrically connected to the segment 151 with which the contact pin 146 has been previously associated. By so doing, he effects energization of the pin 146 in the same manner as that described in connection with the energization of the pin 144 hereinabove described.

As the steering wheel 121 approaches its straight ahead position, the arcuate contact strip 158, being longer than the arcuate contact strip 157, will engage the contact pin 163 which is carried by the plate 141 before the strip 157 connects the pins 161 and 162. The contact strip 158 is grounded to one of the spokes 122 as by a pin 191, with the result that when the strip 158 makes contact with the pin 163, current is conducted from the battery to a conductor.

It is to be understood that the details of the invention as herein disclosed, are subject to alteration within the spirit or scope of the appended claims.

I claim:

1. A switch for controlling the flow of current to a current-consuming device mounted upon a vehicle having a steering wheel, comprising a flexible contact disposed inside the rim of said wheel, conducting means connected thereto, a plurality of fixed contacts spaced from each other and disposed adjacent said flexible contact, a commutator ring comprising a plurality of segments, means electrically connecting each of said segments to one of said fixed contacts, an adjustable pin contact optionally engageable with a selected one of said segments, means electrically connecting said pin contact with said device, and means for moving said flexible contact into engagement with the fixed contact associated with the selected segment.

2. A switch for controlling the flow of current to a current-consuming device mounted upon a vehicle having a steering wheel, comprising a flexible contact disposed inside the rim of said wheel, conducting means connected thereto, a plurality of fixed contacts spaced from each other and disposed adjacent said flexible contact, a commutator ring comprising a plurality of segments, means electrically connecting each of said segments to one of said fixed contacts, an adjustable pin contact optionally engageable with a selected one of said segments, means electrically connecting said pin contact with said device, a flexible strip extending along said flexible contact between it and the center of said wheel, an edge of said strip being exposed on the inside circumference of said rim.

In testimony whereof I have signed my name to this specification.

TONY A. POHJOLA.